(12) United States Patent
Higuchi et al.

(10) Patent No.: US 7,872,766 B2
(45) Date of Patent: Jan. 18, 2011

(54) IMAGE PROCESSING APPARATUS AND IMAGE FORMING APPARATUS

(75) Inventors: Makoto Higuchi, Nara (JP); Kohsuke Harada, Nara (JP); Tokiyuki Okano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1076 days.

(21) Appl. No.: 11/636,019

(22) Filed: Dec. 7, 2006

(65) Prior Publication Data

US 2007/0146762 A1 Jun. 28, 2007

(30) Foreign Application Priority Data

Dec. 26, 2005 (JP) ............... 2005-372713

(51) Int. Cl.
*G06F 3/12* (2006.01)
*G06K 15/00* (2006.01)
*B41J 29/38* (2006.01)
(52) U.S. Cl. ................. 358/1.13; 358/1.16; 347/5
(58) Field of Classification Search ......... 358/1.1–1.18; 347/5, 247
See application file for complete search history.

(56) References Cited

U.S. PATENT DOCUMENTS 6,064,489 A * 5/2000 Nosaki et al. ............... 358/1.13
7,159,959 B2 * 1/2007 Schremp ...................... 347/5
7,233,410 B2 * 6/2007 Sekiguchi et al. ........... 358/1.16
7,443,413 B2 * 10/2008 Jodra et al. .................. 347/247
7,571,481 B2 * 8/2009 Shimizu ....................... 726/24

FOREIGN PATENT DOCUMENTS

| JP | 05-297654 | 11/1993 |
| JP | 10-289031 | 10/1998 |
| JP | 2003-015777 | 1/2003 |
| JP | 2003-312883 | 11/2003 |

* cited by examiner

*Primary Examiner*—James A Thompson
*Assistant Examiner*—Satwant K Singh
(74) *Attorney, Agent, or Firm*—David G. Conlin; Steven M. Jensen; Edwards Angell Palmer & Dodge LLP

(57) ABSTRACT

An FPGA functions as an activation mode setting circuit for loading activation data stored on a PROM into a circuit setting memory and setting an activation mode when activating the CPU. The FPGA outputs an activation mode setting signal to the CPU, and the CPU is activated in the set activation mode. After the CPU is activated, it follows predetermined processing steps, and performs a control operation to load the circuit setting data stored in a storage section into the circuit setting memory. Thus, the FPGA is constructed as a circuit having a desired function, and also constructed as an activation mode setting circuit when activating the CPU.

11 Claims, 4 Drawing Sheets

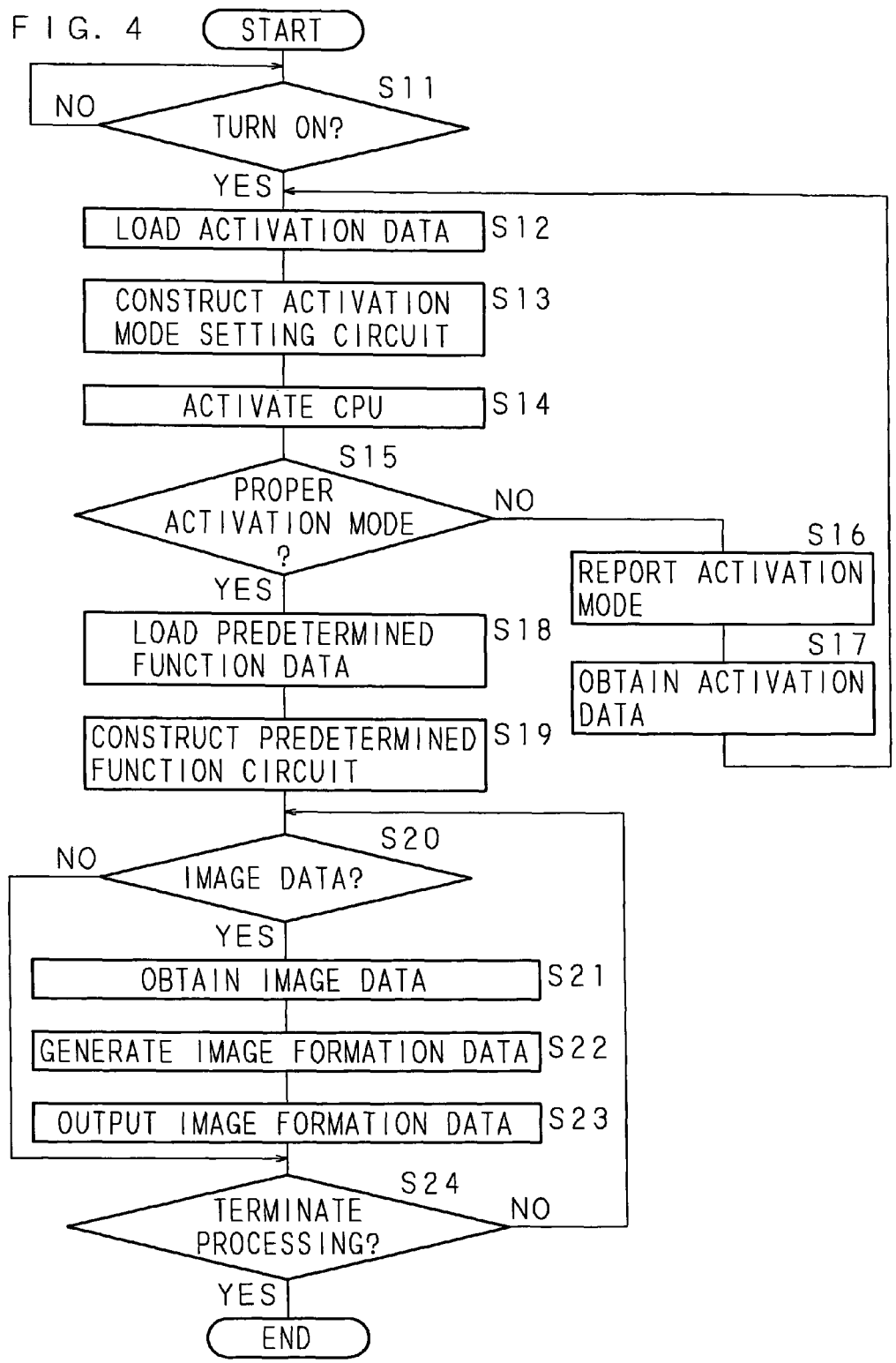

IMAGE PROCESSING APPARATUS AND IMAGE FORMING APPARATUS

CROSS-REFERENCE TO RELATED APPLICATION

This non-provisional application claims priority under 35 U.S.C.§119(a) on Patent Application No. 2005-372713 filed in Japan on Dec. 26, 2005, the entire contents of which are hereby incorporated by reference.

BACKGROUND OF THE INVENTION

1. Field of the Invention

The present invention relates to an image processing apparatus and an image forming apparatus comprising a controller whose activation condition is set to control the processing speed of image data according to a set activation condition.

2. Description of Related Art

In recent years, with an increase in the speed of information processing or an increase in the amount of information as represented by the Internet, image forming apparatuses, such as digital complex machines or printers, having a scanner function, printer function, facsimile function, etc. are used in diverse business scene, and used by many users in places ranging from a small office to large-scale establishment.

On the other hand, as the users' demands on image forming apparatuses diversify, the image forming apparatuses have various kinds of functions, and a greater line up of products are in demand. Examples of such products include relatively low-price, small-size apparatuses with low print or copy speed; high-price, large-size apparatuses capable of performing high-speed processing and having many functions such as a communication network function; medium-size apparatuses positioned between them; or color or exclusively black-and-white apparatuses.

Conventionally, such an image forming apparatus is composed of a plurality of units, such as a scanner section for reading a document, a printing section for printing an image on recording paper, and an image processing section for controlling the scanner section and printing section and processing image data. A scanner section and a printing section with optimum specifications are selected and combined from a variety of specifications in accordance with a type of an image forming apparatus. Therefore, in order to control the scanner section and printing section regardless of the differences in the functions or specifications of the scanner section and printing section, the image processing section comprises a CPU that is activated in a preset activation condition, and the entire image processing section is controlled by the CPU.

Further, in the case where a plurality of units are combined, in order to simplify the management of programs or data in the apparatus, for example, there is proposed an image forming apparatus capable of simplifying the management of programs or data in a storage device between a plurality of units and preventing troubles such as erroneous operations associated with a partial change of units by providing a memory device for collectively storing programs or data for controlling other units within the main body or a main device of the image forming apparatus and transferring the stored programs or data to a rewritable memory device in another unit at the time of initialization (see, for example, Japanese Patent Application Laid-Open No. 5-297654 (1993)).

BRIEF SUMMARY OF THE INVENTION

In the image forming apparatus of Japanese Patent Application Laid-Open No. 5-297654 (1993)), however, since the programs or data for controlling other units are collectively managed in the main body of the image forming apparatus, it is necessary to store a large volume of programs and data beforehand to control various kinds of external units, and consequently there is a possibility that the capacity of installed memory may increase considerably and the cost may rise.

Moreover, in a conventional example, in order to set an activation condition of the CPU according to the functions or specifications of the scanner section and printing section, a setting circuit to be used exclusively for setting an activation condition of the CPU is required, and therefore there is a possibility of an increase in the hardware resources and a rise in the cost.

The present invention has been made with the aim of solving the above problems, and it is an object of the invention to provide an image processing apparatus and an image forming apparatus, comprising an integrated circuit element having a memory, and capable of being set so as to function based on information to be written in the memory, and capable of effectively using hardware resources by setting an activation condition of said controller based on the information written in the memory by said integrated circuit element.

Another object of the invention is to provide an image processing apparatus capable of being easily maintained even when the apparatus is in a distant place by causing the controller to obtain information from outside sources.

Still another object of the invention is to provide an image processing apparatus capable of confirming whether the apparatus is operating according to the settings and capable of improving the quality of the apparatus by causing the controller to determine whether or not the controller is activated in a set activation condition.

Yet another object of the invention is to provide an image processing apparatus in which, when the controller is not activated in a set activation condition, the controller can obtain information for setting the activation condition and write the obtained information in the memory to return the controller to a desired activation condition even when an abnormal state in which the controller is not activated in the desired activation condition occurs, thereby capable of further improving maintenance performance.

An image processing apparatus according to the present invention is characterized by comprising: a controller, capable of being set in a plurality of activation conditions, for controlling a processing speed of image data according to a set activation condition; and an integrated circuit element having a memory, and capable of being set so as to function based on information to be written in the memory, wherein said integrated circuit element sets an activation condition of said controller based on the information written in the memory.

The image processing apparatus according to the present invention is characterized in that the controller obtains information from outside sources.

The image processing apparatus according to the present invention is characterized in that the controller determines whether or not the controller is activated in a set activation condition.

The image processing apparatus according to the present invention is characterized in that, if the controller is not activated in the set activation condition, the controller obtains information for setting the activation condition and writes the obtained information in the memory.

The image processing apparatus according to the present invention is characterized in that the integrated circuit element is an FPGA (Field Programmable Gate Array).

An image forming apparatus according to the present invention is characterized by comprising: the image processing apparatus described above for generating image formation data by processing image data; and an image forming section for forming an image based on the image formation data generated by the image processing apparatus.

In the present invention, when the controller (for example, a CPU) is activated in a desired activation condition (for example, a condition shown by the operation clock frequency of the CPU), the integrated circuit element (such as, for example, an FPGA (Field Programmable Gate Array) and a CPLD (Complex Programmable Logic Device)) writes information in a memory provided on the integrated circuit element so that the integrated circuit element is constructed as a setting circuit for setting an activation condition of the controller. Accordingly, the integrated circuit element activates the controller in a desired activation condition. When the controller is activated, if the information is rewritten to cause the integrated circuit element to realize another desired function, the integrated circuit element is used not only as a circuit for setting an activation condition of the controller, but also as a circuit for realizing the desired function. Thus, there is no need to provide a setting circuit to be used exclusively for setting an activation condition.

In the present invention, the information is obtained from outside sources. For instance, the information stored in an external storage device is obtained through a network, a communication line, etc.

In the present invention, the controller determines whether or not the controller is activated in a set activation condition. Thus, if there is a need to construct the integrated circuit element as a circuit for setting an activation condition of the controller, it is confirmed whether or not the controller is activated according to the settings.

In the present invention, when the controller is not activated in the set activation condition, the controller obtains information for setting the activation condition. The controller writes the obtained information in the memory. Accordingly, even when an abnormal condition in which the controller is not activated in a desired activation condition occurs, the controller returns to the desired activation condition.

According to the present invention, by comprising an integrated circuit element having a memory, and capable of being set so as to function based on information to be written in the memory, and by setting an activation condition of said controller based on the information written in the memory by said integrated circuit element, it is possible to use the integrated circuit element not only as a circuit for setting an activation condition of the controller, but also as a circuit for realizing a desired function, and it is possible to eliminate the need of a circuit to be used exclusively for setting an activation condition and it is possible to effectively utilize hardware resources.

According to the present invention, since the controller obtains information from outside sources, it is possible to obtain information stored in an external storage device through, for example, a network, a communication line, etc. Therefore, even when the apparatus is in the distant place, it is possible to easily change the function of the integrated circuit element, and it is possible to ease maintenance.

According to the present invention, since the controller determines whether or not the controller is activated in a set activation condition, it is possible to confirm whether the controller is operated in accordance with the settings, and it is possible to improve the quality of the apparatus.

According to the present invention, if the controller is not in a set activation condition, information for setting the activation condition is obtained, and the obtained information is written in the memory. Therefore, even when an abnormal condition in which the controller is not activated in a desired activation condition occurs, it is possible to return the controller to the desired activation condition, and it is possible to further improve the maintenance performance.

The above and further objects and features of the invention will more fully be apparent from the following detailed description with accompanying drawings.

BRIEF DESCRIPTION OF THE SEVERAL VIEWS OF THE DRAWINGS

FIG. 4 is a flowchart showing the processing steps of the image processing controller.

DETAILED DESCRIPTION OF THE INVENTION

Figure 1:
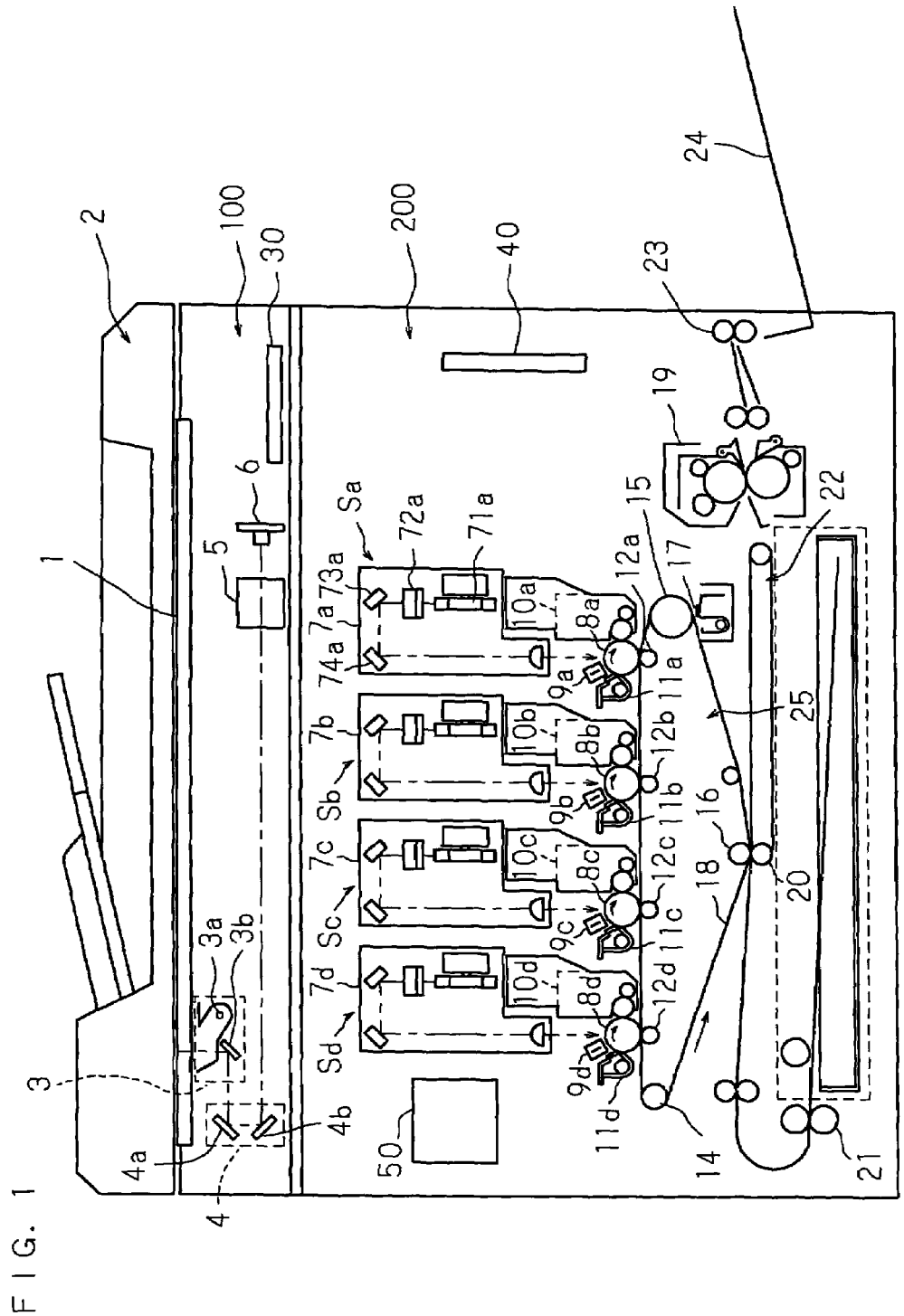
FIG. 1 is a schematic view of the front side of a digital complex machine as one example of an image forming apparatus comprising an image processing apparatus according to the present invention.

The following description will explain the present invention, based on the drawings illustrating an embodiment thereof. FIG. 1 is a schematic view of the front side of a digital complex machine as one example of an image forming apparatus comprising an image processing apparatus according to the present invention. In FIG. 1, 1 is a glass platen for placing a document. An automatic document feeder 2 is mounted above the platen 1. An image reading section 100 is disposed under the platen 1, and an image forming section 200 is positioned under the image reading section 100.

The image reading section 100 comprises scanning units 3 and 4 which move in a reciprocating manner parallel to the lower surface of the platen 1; an optical lens 5; a CCD line sensor 6 as a photoelectric conversion element; and an image reading controller 30, etc. The scanning unit 3 comprises a light source 3a for irradiating laser light on a document placed on the platen 1, a mirror 3b for guiding the laser light reflected by the document to a predetermined optical path, etc. Moreover, the scanning unit 4 comprises mirrors 4a and 4b for guiding the laser light reflected by the document to a predetermined optical path, etc.

The optical lens 5 focuses the laser light guided from the scanning unit 4 onto a predetermined position on the CCD line sensor 6. The CCD line sensor 6 photoelectrically converts the focused light image, and outputs an electric signal. The CCD line sensor 6 reads a color image, and outputs to the image reading controller 30 image data obtained by decomposing the color image into color components of R (red), G (green) and B (blue). The image reading controller 30 controls the entire image reading section 100. Details of the image reading controller 30 will be described later.

The image forming section 200 includes image forming stations Sa, Sb, Sc, and Sc corresponding to black (K), cyan (C), magenta (M) and yellow (Y) colors, respectively, in the center. The image forming stations Sa, Sb, Sc, and Sc are arranged in this order from the upstream side on a paper transport path in a horizontal direction. The image forming station Sa corresponding to black comprises a photosensitive drum 8a that is driven to rotate, a charger 9a for uniformly charging charges of single polarity on the surface of the photosensitive drum 8a, an optical writing unit 7a for forming an electrostatic latent image on the surface of the photosensitive drum 8a by a photoconductive function, a developing device 10a for developing the electrostatic latent image formed on the surface of the photosensitive drum 8a, and a transfer discharger 12a for transferring a toner image on the surface of the photosensitive drum 8a to an intermediate transfer belt 18, a cleaning device 11a for removing the toner remaining on the photosensitive drum 8a, etc.

The optical writing unit 7a comprises a semiconductor laser element (not shown) for emitting dot light modulated according to image formation data, a polygon mirror 71a for deflecting laser light emitted from the semiconductor laser element in a main scanning direction, a lens 72a and mirrors 73a and 74a for focusing the laser light deflected by the polygon mirror 71a onto the surface of the photosensitive drum 8a, etc. Since optical writing units 7b, 7c and 7d have structures similar to the optical writing unit 7a, the explanation thereof is omitted.

Note that it may be possible to use an LED head (optical writing optical system) composed of a light emitting diode array and a focus lens array, instead of the optical writing unit 7a using a semiconductor laser element. The LED head has a smaller size compared to the optical writing unit 7a using a semiconductor laser element, and is not noisy because it has no movable part. It is therefore possible to suitably use the LED head for an image forming apparatus that requires a plurality of optical writing units, such as a tandem type digital color complex machine.

Since the image forming stations Sb, Sc, and Sd corresponding to cyan, magenta and yellow colors, respectively, have the same function as the image forming station Sa, the explanation thereof is omitted.

A transfer and transport belt mechanism 25 is placed under the image forming sections Sa, Sb, Sc, and Sd. The transfer and transport belt mechanism 25 comprises a driving roller 14, a driven roller 15, a backup roller 16, an intermediate transfer belt 18 wound on the respective rollers, etc. The intermediate transfer belt 18 comes into contact with the photosensitive drums 8a, 8b, 8c, and 8d near the transfer dischargers 12a, 12b, 12c, and 12d. A cleaning device 17 for removing the toner remaining on the intermediate transfer belt 18 is provided under the driven roller 15.

A paper feed mechanism 21 is provided under the transfer and transport belt mechanism 25. The paper feed mechanism 21 separates a stack of paper stored in a paper tray one sheet at a time and supplies it to a secondary transfer and transport belt unit 22. The secondary transfer and transport belt unit 22 supplies and transports the paper according to the image forming timing with the intermediate transfer belt 18 on which an image is formed, so that the image is transferred from the intermediate transfer belt 18 to the paper by a secondary transfer discharger 20 disposed near the backup roller 16. A fixing device 19 for fixing a toner image transferred and formed again on the paper is provided on the downstream side of the secondary transfer and transport belt unit 22. The paper that has passed through the fixing rollers of the fixing device 19 is discharged onto a paper discharge tray 24 by discharge rollers 23.

An image processing controller 40 controls the entire image forming apparatus, and an image forming controller 50 controls the entire image forming section 200. Details of the image processing controller 40 and image forming controller 50 will be described later.

Figure 2:
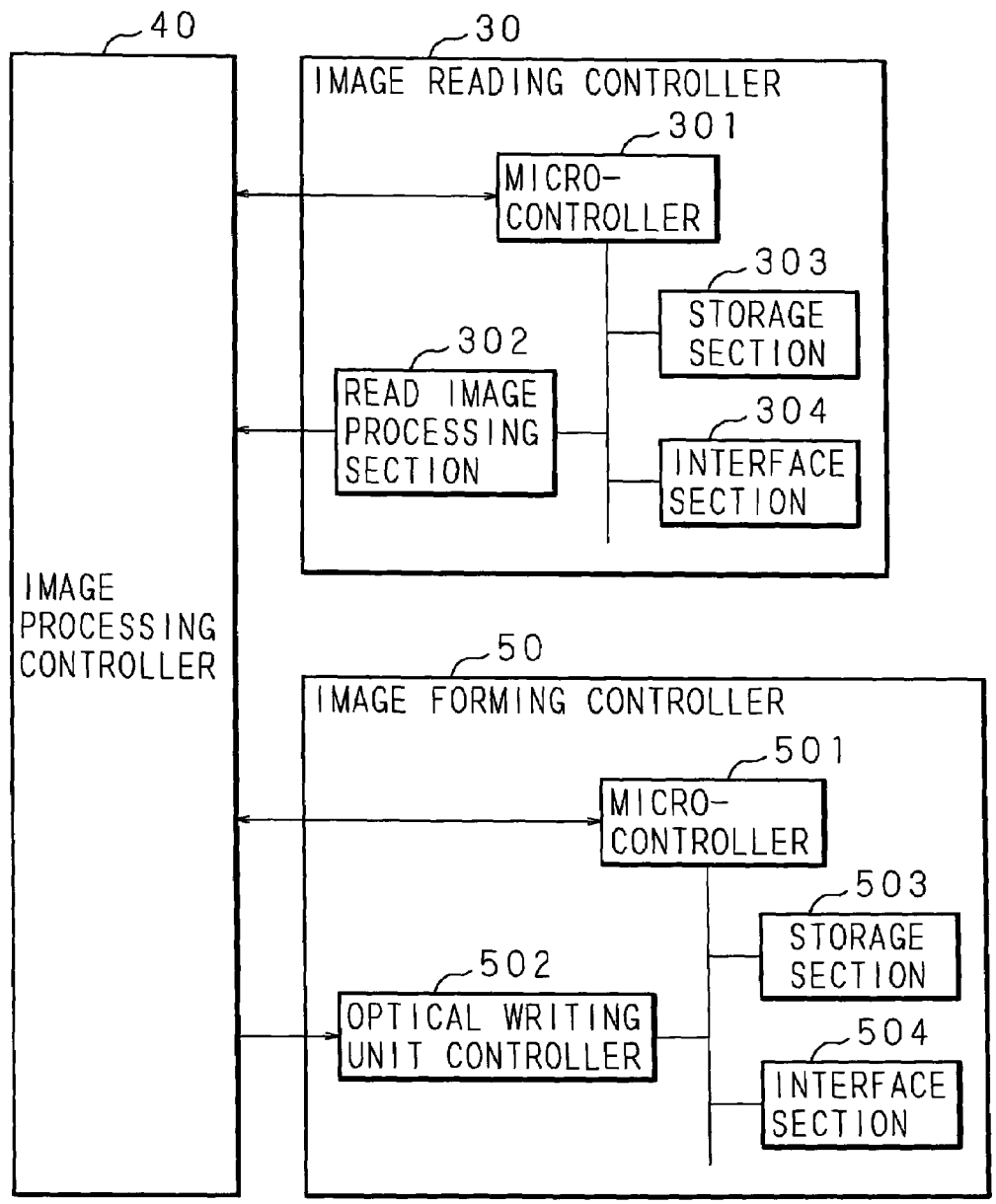
FIG. 2 is a block diagram showing the internal structure of the digital complex machine as one example of an image forming apparatus comprising an image processing apparatus according to the present invention.
Figure 3:
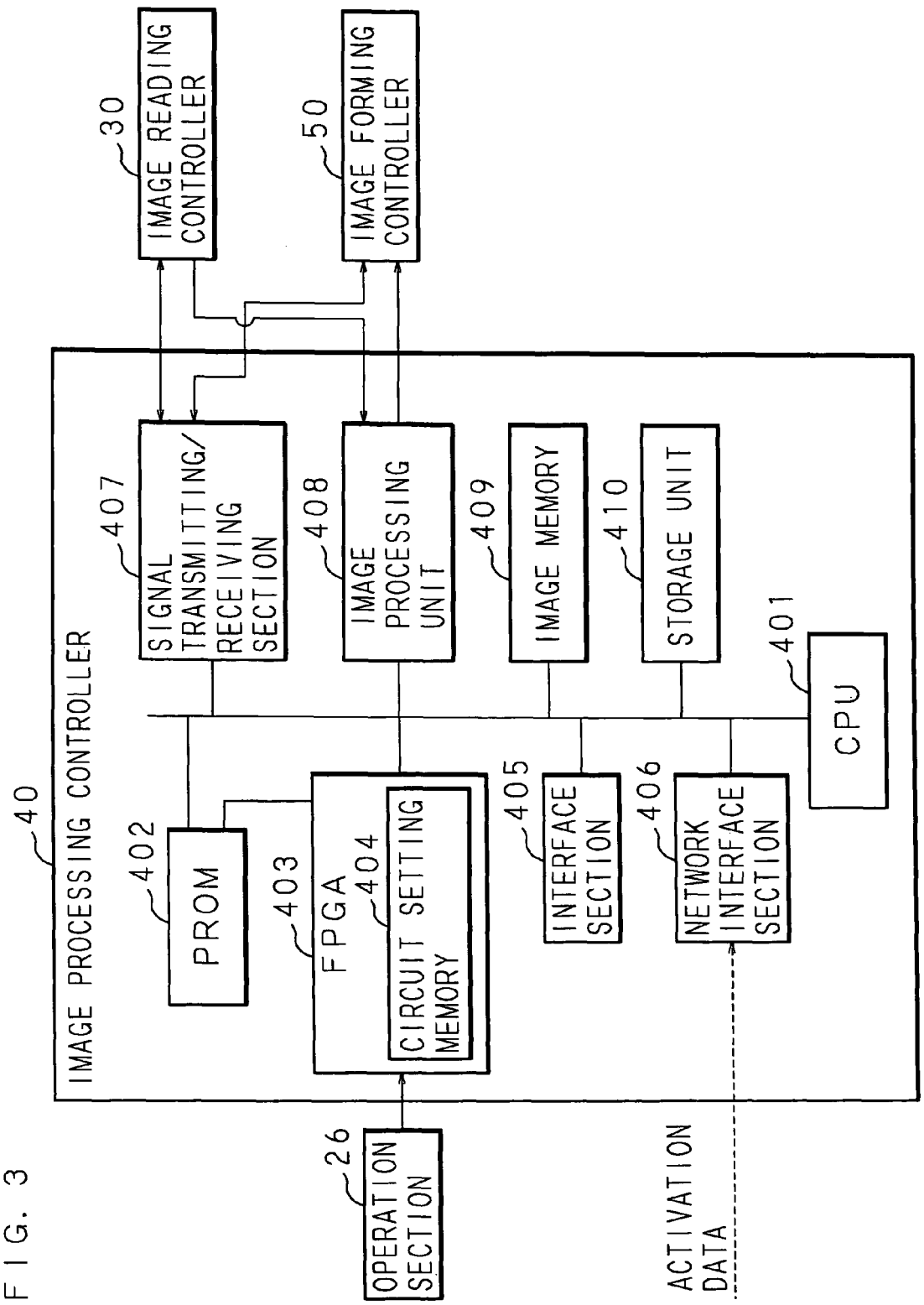
FIG. 3 is a block diagram showing the internal structure of an image processing controller as one example of an image processing apparatus according to the present invention.

FIG. 2 is a block diagram showing the internal structure of the digital complex machine as one example of an image forming apparatus comprising an image processing apparatus according to the present invention, and FIG. 3 is a block diagram showing the internal structure of the image processing controller 40 as one example of an image processing apparatus according to the present invention.

The image reading controller 30 comprises a micro-controller 301, a read image processing section 302, a storage section 303, an interface section 304, etc., and outputs image data obtained by reading a document through the read image processing section 302 to the image processing controller 40.

The read image processing section 302 converts an analog electric signal outputted from the CCD line sensor 6 into a digital signal, and outputs the converted imaged data to the image processing controller 40. The storage section 303 stores programs and data for controlling the operation of the image reading controller 30.

The interface section 304 outputs a control signal for driving and controlling a motor (not shown) for driving the scanning units 3 and 4, and obtains signals from various kinds of sensors (for example, a document transport detection sensor, a laser light receiving sensor, etc.) in the image reading section 100.

The micro-controller 301 controls the entire image reading controller 30, and gives and receives signals to/from the image processing controller 40.

The image processing controller 40 comprises a CPU 401 (controller), a PROM 402, an FPGA (Field Programmable Gate Array) 403, an interface section 405, a network interface section 406, a signal transmitting and receiving section 407, an image processing unit 408, an image memory 409, a storage section 410, etc, generates image formation data for forming an image, based on image data obtained from the image reading controller 30, or image data obtained from an external personal computer, etc. through a computer network, and outputs the generated image formation data to the image forming controller 50.

The PROM 402 stores in advance activation data for setting an activation mode of the CPU 401 (for example, for determining the ratio between the internal clock of the CPU 401 and the operation clock of a CPU bus, a difference in data type on the CPU bus, etc.) when power is supplied to the image forming apparatus. When power is supplied, the activation data stored in the PROM 402 is loaded into the FPGA 403. Note that, a load circuit for loading the activation data into the FPGA 403 is constructed beforehand in the FPGA 403.

The FPGA 403 comprises a circuit setting memory 404, and has, for example, a structure in which a function generator capable of generating an arbitrary logic circuit is used as one logic block, many logic blocks are arranged and connected in lattice-like wirings, and a switch controlled by the FPGA 403 is connected to an intersection of the wirings. Thus, by changing data to be loaded into the circuit setting memory 404, it is possible to realize an arbitrary logic function.

By loading the activation data stored on the PROM 402 into the circuit setting memory 404, the FPGA 403 functions as an activation mode setting circuit for setting an activation mode when activating the CPU 401. The FPGA 403 constructed as the activation mode setting circuit outputs an activation mode setting signal to the CPU 401. Consequently, the CPU 401 is activated in a set activation mode.

By changing the frequency of the operation clock of the CPU 401 according to the activation mode, it is possible to change the processing speed of the image processing controller 40. For instance, the input speed when inputting image data from the image reading controller 30 (transfer speed of image data) and the output speed when outputting the image formation data generated in the image processing controller 40 to the image forming controller 50 (transfer speed of image formation data) can be set to desired values. Thus, even when the document read speed of the image reading section 100, or the image forming speed (print speed) of the image forming section 200, varies depending on functions or specifications, it is possible to set the image processing controller 40 to an optimum processing speed.

The operation section 26 is a touch panel type operation panel, and comprises various kinds of keys and switches for receiving operation instructions (for example, to turn on the power supply, terminate processing, etc.) from a user or a service person; and a liquid crystal display for displaying information to be given to the user. When an operation to supply power is executed, an operation signal is outputted to the FPGA 403 through the operation section 26, and the activation data stored on the PROM 402 is loaded into the FPGA 403.

The interface section 405 has an interface function to give and receive signals to/from various kinds of sensors and a power supply monitoring circuit (not shown) in the digital complex machine.

The network interface section 406 has a communication function for giving and receiving image data to/from an external personal computer (hereinafter referred to as the "PC"). The image processing controller 40 receives image data created by the PC through the network interface section 406, and outputs the received image data to an image processing unit 408.

The storage section 410 is composed of a flash EEPROM, HDD, etc., and stores a program and data for controlling the operation of the image processing controller 40. Moreover, the storage section 410 stores circuit setting data for constructing the FPGA 403, which is designed as an activation mode setting circuit, as a circuit for realizing another desired function after activating the CPU 401. The activated CPU 401 follows predetermined processing steps and performs a control operation to load the circuit setting data stored in the storage section 410 into the circuit setting memory 404. Thus, it is possible to construct the FPGA 403 not only as a circuit having a desired function after the activation of the CPU 401, but also as an activation mode setting circuit for the CPU 401 when activating the CPU 401, and it is possible to effectively use hardware resources.

The signal transmitting and receiving section 407 gives and receives signals to/from the micro-controllers 301 and 501 in the image reading controller 30 and the image forming controller 50. Accordingly, the image processing controller 40 controls the operations of the image reading controller 30 and the image forming controller 50.

The image processing unit 408 generates image formation data for printing by performing desired processing, such as density conversion, tone correction and filtering, on image data obtained through the image reading controller 30 or the network interface section 406, and outputs the generated image formation data to the image forming controller 50. Further, the image processing unit 408 appropriately stores the image data being processed into the image memory 409.

The CPU 401 controls not only the entire operation of the image processing controller 40, but also the entire operation of the image forming apparatus. In other words, the CPU 401 controls the operations of the image processing controller 40 and the image forming apparatus according to the control steps shown by a control program stored in the storage section 410.

After being activated in an activation mode, the CPU 401 uses a performance confirming circuit installed in the CPU 401 and self-checks whether or not it is activated in a set activation mode. If the CPU 401 is not activated in the set activation mode, it reports the activation mode (for example, through the operation section 26), obtains activation data stored in a predetermined external storage device (not shown) through the network interface section 406, and loads the obtained activation data into the circuit setting memory 404 so as to construct the FPGA 403 as the activation setting circuit again. Consequently, the CPU 401 is reactivated in the predetermined activation mode. Note that the activation data may be obtained using a USB memory, in addition to the use of the external storage device through the network interface section 406.

The image forming controller 50 comprises a micro-controller 501, an optical writing unit controller 502, a storage section 503, an interface section 504, etc., and obtains the image formation data outputted from the image processing controller 40.

The optical writing unit controller 502 outputs image formation data outputted from the image processing controller 40 to the optical writing units 7a, 7b, 7c, and 7d.

The storage section 503 stores a program and data for controlling the operation of the image forming controller 50.

The interface section 504 gives and receives signals for controlling the development devices 10a to 10d, photosensitive drums 8a to 8d, transfer dischargers 12a to 12d, fixing device 19, and transport systems such as the transfer and transport belt mechanism 25.

The micro-controller 501 controls the entire image forming controller 50, and also gives and receives signals to/from the image processing controller 40.

Next, the operation of the image processing controller 40 will be explained. FIG. 4 is a flowchart showing the processing steps of the image processing controller 40. The image processing controller 40 determines whether or not an operation to turn on the power supply was performed (S11). If the operation to turn on the power supply was not performed (NO in S11), the image processing controller 40 continues the process of step S11 and waits until the operation to turn on the power supply is performed.

If the operation to turn on the power supply was performed (YES in S11), the image processing controller 40 loads the activation data stored on the PROM 402 into the circuit setting memory 404 (S12). Accordingly, the image processing controller 40 constructs the FPGA 403 as an activation mode setting circuit (S13).

According to an activation mode setting signal outputted from the FPGA 403, the image processing controller 40 activates the CPU 401 (S14). With the self-check function of the activated CPU 401, the image processing controller 40 determines whether or not the CPU 401 is activated in a set activation mode (S15). If the CPU 401 is not activated in the set activation mode (NO in S15), the image processing controller 40 reports the activation mode (S16), obtains activation data through the network interface section 406 (S17), and continues to perform the processing in and after steps S12.

If the CPU 401 is activated in the set activation mode (YES in S15), the image processing controller 40 loads the circuit setting data stored in the storage section 410 for realizing a predetermined function into the circuit setting memory 404 (S18). Accordingly, the image processing controller 40 constructs the FPGA 403 as a predetermined function circuit (S19).

The image processing controller 40 determines whether or not there is image data (S20). If there is image data (YES in S20), the image processing controller 40 obtains the image data (S21), and generates image formation data by performing predetermined processing on the obtained image data (S22). The image processing controller 40 outputs the image formation data (S23), and determines whether or not there is a request to terminate the processing (S24). If there is no request to terminate the processing (NO in S24), the image processing controller 40 continues the processing in and after step S20.

On the other hand, if there is no image data (NO in S20), the image processing controller 40 continues the processing in and after step S24. If there is a request to terminate processing (YES in S24), the image processing controller 40 terminates the processing.

As explained above, in the present invention, by using the FPGA 403 when activating the CPU 401, the FPGA 403 can be used not only as an activation mode setting circuit for the CPU 401, but also as a circuit for realizing a desired function after the activation of the CPU 401, and thus it is possible to eliminate the need of a circuit used exclusively as an activation mode setting circuit and it is possible to effectively use hardware resources. Moreover, it is possible to obtain activation data stored in an external storage device through a network, a communication line, etc., and, even when a digital complex machine is located in a distant place, it is possible to easily change the function of the EPGA 403, and it is possible to ease maintenance. Further, it is possible to confirm whether or not the CPU 401 is activated in a set activation mode, and it is possible to improve the quality of the digital complex machine. In addition, even when an abnormal state in which the CPU 401 is not activated in a desired activation mode occurs, it is possible to return the CPU 401 to a desired activation mode and further improve the maintenance performance.

In the above-described embodiment, the structure of the image processing controller 40 is merely one example, and the present invention is not restricted to this. For example, in the image processing controller 40, a part (for example, a function circuit, etc.) that starts operating after the activation of the CPU 401 may be realized by the FPGA 403. It may also be possible to construct the image processing controller 40 to appropriately share the processing executed by the CPU 401 and the processing executed by the FPGA 403.

Although the above-described embodiment illustrates a structure using an FPGA (Field Programmable Gate Array) as an integrated circuit element, the present invention is not limited to this, and it may be possible to use a CPLD (Complex Programmable Logic Device) or other device if it can be repeatedly changed as the structure of hardware.

Although the above-described embodiment illustrates a structure where the storage section 410, interface section 405, etc. are connected to a CPU bus, the present invention is not limited to this, and it may be possible to connect a chip set to the CPU bus, and connect the storage device 410, interface section 405, etc. to the chip set through a universal bus. In this case, it is possible to unify and simplify the CPU bus between the CPU 401 and the chip set to achieve high speeds, and the chip set can control the giving and receiving of signals between the respective sections through the universal bus.

Although the above-described embodiment illustrates an image forming apparatus such as an intermediate transfer type digital color copying machine, the present invention is not limited to this and is applicable to a direct transfer type image forming apparatus. Further, although a so-called multistage type image forming apparatus is explained, the present invention is not limited to this and may be a single-type image forming apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
    an activation data memory for storing activation data for setting an activation state of a controller;
    the controller, capable of being set in a plurality of activation conditions, for controlling a processing speed of image data according to a set activation condition; and
    an integrated circuit element having a setting memory, and capable of being set so as to function based on the activation data to be read from the activation data memory and written in the setting memory, wherein
    when power is supplied, the activation data stored in the activation data memory is loaded into the setting memory of the integrated circuit element, and said integrated circuit element sets an activation condition of said controller based on the activation data written in the setting memory.

2. The image processing apparatus according to claim 1, wherein said controller obtains information from outside sources.

3. The image processing apparatus according to claim 2, wherein said controller determines whether or not said controller is activated in a set activation condition.

4. The image processing apparatus according to claim 3, wherein, if said controller is not activated in the set activation condition, said controller obtains information for setting the activation condition and writes the obtained information in the memory.

5. The image processing apparatus according to claim 1, wherein said controller determines whether or not said controller is activated in a set activation condition.

6. The image processing apparatus according to claim 1, wherein said integrated circuit element is an FPGA (Field Programmable Gate Array).

7. The image processing apparatus according to claim 1, further comprising obtaining means for obtaining information from outside sources.

8. The image processing apparatus according to claim 7, further comprising determining means for determining whether or not said controller is activated in a set activation condition.

9. The image processing apparatus according to claim 8, wherein,
    if said determining means determines that said controller is not activated in the set activation condition, said obtaining means obtains information for setting the activation condition.

10. The image processing apparatus according to claim 1, further comprising determining means for determining whether or not said controller is activated in a set activation condition.

11. An image forming apparatus comprising:
    an image processing apparatus as set forth in claim 1 for generating image formation data by processing image data; and
    an image forming section for forming an image based on the image formation data generated by said image processing apparatus.

* * * * *